US006865890B2

(12) United States Patent
Walker

(10) Patent No.: US 6,865,890 B2
(45) Date of Patent: Mar. 15, 2005

(54) SOFTWARE SYSTEM FOR VERIFICATION OF GAS FUEL FLOW

(76) Inventor: Ronald Steven Walker, 2825 Summer Swan Dr., Orlando, FL (US) 32825

(*) Notice: Subject to any disclaimer, the term of this patent is extended or adjusted under 35 U.S.C. 154(b) by 0 days.

(21) Appl. No.: 10/457,601

(22) Filed: Jun. 9, 2003

(65) Prior Publication Data

US 2004/0016236 A1 Jan. 29, 2004

Related U.S. Application Data

(60) Provisional application No. 60/387,151, filed on Jun. 7, 2002.

(51) Int. Cl.[7] .............................. F02C 3/30; F02C 9/48
(52) U.S. Cl. ............................ 60/773; 60/775; 60/39.3; 60/39.55
(58) Field of Search .................. 60/773, 775, 39.3, 60/39.53, 39.55

(56) References Cited

U.S. PATENT DOCUMENTS

| 4,160,362 A | | 7/1979 | Martens et al. | |
|---|---|---|---|---|
| 4,259,835 A | | 4/1981 | Reed et al. | |
| 4,305,129 A | * | 12/1981 | Yannone et al. | ......... 30/39.281 |
| 4,308,463 A | | 12/1981 | Giras et al. | |
| 4,687,946 A | | 8/1987 | Jones | |
| 4,881,184 A | | 11/1989 | Abegg, III et al. | |
| 5,307,619 A | * | 5/1994 | McCarty et al. | .............. 60/775 |
| 5,761,895 A | | 6/1998 | Chu et al. | |
| 5,794,446 A | | 8/1998 | Earley et al. | |
| 6,226,974 B1 | | 5/2001 | Andrew et al. | |
| 6,634,165 B2 | * | 10/2003 | Tomlinson et al. | .......... 60/39.3 |
| 6,715,295 B2 | * | 4/2004 | Gadde et al. | ................. 60/775 |

OTHER PUBLICATIONS

GE Power Systems; Heavy–Duty Gas Turbine Operating and Maintenance Considerations; Hoeft, Janawitx and Keck, GE Energy Services, Atlanta, GA Jan. 2003.
Speedtronic Mark V Steam Turbine Control System; Kure–Jensen and Barker; GE Power Systems; 1996.
Speedtronic Mark V Steam Turbine Control System; Johnson, Miller and Ashley; GE Power Systems; undated.

* cited by examiner

Primary Examiner—Ted Kim
(74) Attorney, Agent, or Firm—Joseph T. Guy; Nexsen Pruet, LLC

(57) ABSTRACT

A computerized system for accurate, independent verification of natural gas fuel flow in order to control $H_2O$ injection flows. The $H_2O$ is injected into a combustion system to control emissions. The system comprises:
receiving gas turbine control parameters from a gas turbine control system;
receiving control parameters from a megawatt transducer;
calculating values based upon readings from said control system and said megawatt transducer;
comparing said values to a megawatt reference curve;
detecting an abnormal reading;
starting a timing sequence during which said reading is monitored;
transferring $NO_x$ and $H_2O$ water injection control to a megawatt module at completion of said timing sequence;
alerting operator said transfer;
allowing for return of control to said gas turbine control system once said abnormal reading is corrected.

6 Claims, 3 Drawing Sheets

SOFTWARE SYSTEM FOR VERIFICATION OF GAS FUEL FLOW

RELATED APPLICATIONS

This application claims priority to, and is a continuation-in-part of provisional patent application 60/387,151, filed Jun. 7, 2002, now expired.

FIELD OF THE INVENTION

The present invention relates to a method for providing an independent verification of gas fuel flow which may be used to control water injection flows, which are used to control emissions from a natural gas power plant.

BACKGROUND OF THE INVENTION

As the demand for electricity skyrockets in the United States and the world, government and private industry must uncover and maximize power sources. One of these sources is natural gas.

Origins of methane ($CH_4$) include conversion of organic material by microorganisms (biogenesis), thermal decomposition of buried organic matter (thermogenesis), and deep crustal processes (abiogenesis). Buoyant methane migrates upward through rock pores and fractures and either accumulates under impermeable layers or eventually reaches the surface and dissipates into the atmosphere. Biogenic methane results from the decomposition of organic matter by methanogens, which are methane-producing microorganisms and which pervade the near surface of the Earth's crust in regions devoid of oxygen, where temperatures do not exceed 97 degrees Celsius (207 degrees Farenheit). Methanogens also live inside the intestines of most animals (people included) and in the cud of ruminants such as cows and sheep, where they aid in the digestion of vegetable matter.

Because the methane generated in the subsurface is less dense than the rocks in which it is produced, it diffuses slowly upward through tiny, interconnected pore spaces and fractures, and it can eventually reach the Earth's surface and dissipate into the atmosphere. In places, however, the diffusion of methane is impeded by impermeable rock layers and gas can become trapped in structures. If enough gas accumulates under these impermeable layers, the structures can be drilled and gas can be extracted for use as an energy source.

For natural gas, the cycle begins at gas wells, where gas is extracted from the ground. After processing, the gas is compressed and distributed through pipelines. To generate electricity, fuels such as oil, coal, natural gas, nuclear, hydroelectric and others must be extracted, processed, transported and converted.

Natural gas can be used to generate electricity in many different ways. Natural gas power plants generating more than a couple of hundred megawatts (1 megawatt=1 MW=1 million watts) use the same technology as coal fired power plants. Natural gas is burned to produce heat, which boils water, creating steam which passes through a turbine to generate electricity. Slightly smaller natural gas power plants can use gas turbines to produce electricity. Gas turbines are similar to jet engines and can convert up to half the energy of the natural gas fuel into electricity.

These power plants produce emissions that can be harmful to the environment, and are subject to regulatory control by local, state and national governments. In the case of natural gas fired electricity plants, these emission include Nitrous Oxides ($NO_x$) and Carbon Monoxide (CO).

One current approach to controlling and monitoring these emissions utilizes a control algorithm and control system, which uses a signal generated from fuel flow transmitters associated with a metering tube orifice. These transmitters are set up in a split-range function; such that the first transmitter measures low gas flows and the second transmitter measures high gas flows, in order to provide accurate flow readings across the full range of gas flow. The transmitters are used to provide readings to a control system, which in turn controls the injection of steam or water into the combustors to meet emissions and operating requirements. The amount of water required is a function of the fuel flow, the fuel type, the ambient humidity and $NO_x$ emissions levels required by the relevant regulations. Transmitters of this type tend to drift and require biannual calibration, at a minimum, to stay within acceptable tolerances.

When the transmitters are miscalibrated, or gas condensate collects in a leg of the fuel flow transmitter, an out-of-compliance event can exist and yet not be detected by the current monitoring system, or a false alarm may be generated.

The present invention is particularly suitable for use with the General Electric SPEEDTRONIC™ Mark IV, Mark V, and Mark VI Gas Turbine Control Systems. The SPEEDTRONIC™ Control Systems are computer systems that utilize microprocessors to execute programs to control the operation of the gas turbine using the transmitter data, sensor inputs and instructions from human operators.

While the above device is a fair representation of the current prior art, there remains room for improvement as defined by the currently-claimed invention.

SUMMARY OF THE INVENTION

It is an object of the present invention to provide a highly accurate system for measuring natural gas fuel flow.

It is a further object of the present invention to generate an algorithm which can be used to detect and control out-of-compliance events.

It is a further object of the present invention to monitor gas fuel flow transmitters and provide notification when gas fuel flow transmitters are out of calibration.

It is a further object of the present invention to utilize an existing megawatt transducer signal to produce a conditioned signal, in the form of a curve, which is compatible with fuel flow scaling.

It is a further object of the present invention to allow for $H_2O$ injection based on a megawatt reference curve for $NO_x$ control when required.

These as well as other objects are accomplished by a computerized system for accurate, independent verification of natural gas fuel flow in order to control $H_2O$ injection flows as said $H_2O$ is injected into a combustion system primarily to control $NO_x$ and CO emissions.

DETAILED DESCRIPTION OF THE INVENTION

Figure 1:
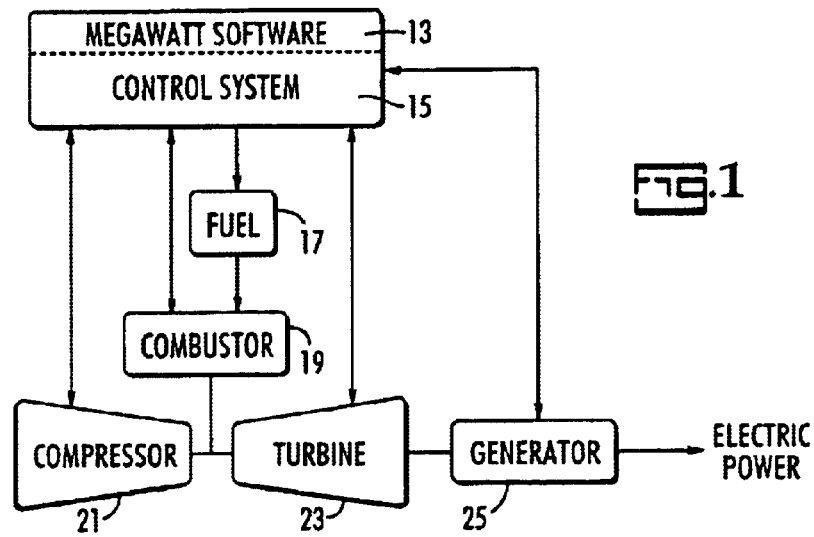
FIG. 1 illustrates a gas turbine constructed in a well known manner and an associated control system in accordance with the invention.

In accordance with this invention it has been found that a reliable process source, particularly the megawatt transducer, can be utilized for detecting and controlling out-of-compliance events as they relate to gas flow when being used for control of $NO_x$ and CO emissions through a water injection-based system. Various other advantages and features will become apparent from the following detailed description, together with reference to the figures.

The description and figures will utilize a mnemonic nomenclature typical as set forth in Gas Turbine Standard TM-30 and reproduced for clarity in the following Table:

TABLE

| Letter | Gas Turbine Origin | Physical Parameter | Type |
|---|---|---|---|
| A | Air | Current, Amperes | |
| B | Bearing | Vibration | |
| C | Compressor | Clearance | |
| D | Driven Load | Differential Pressure | |
| E | Electrical | | |
| F | Fuel | Frequency | |
| G | Governor | Stress | |
| H | | Hertz | |
| I | Intercooler | Impact Press | |
| J | | | |
| K | Combustion | | Constant |
| L | Lube | Force | |
| M | Extractions | Miscellaneous | |
| N | Inlet Air Nozzle | Speed | |
| O | | | |
| P | Start Turn Device | Static Pressure | |
| Q | (Buffers) | Volume or weight flow | |
| R | Regenerator | | Reference, Control |
| S | Station on Steam | Stroke/Position | |
| T | Turbine | Temperature | |
| U | Auxiliary | Utilization | |
| V | Voltage | | |
| W | Water/Steam | Watts | |
| X | Exhaust | Ratio | |
| Y | | | |
| Z | (Local Signals) | | |

By way of illustration, signal "DW" would represent a driven load, in differential pressure, of water or steam, in watts. Similarly, signal "KDWC", would represent a signal related to combustion, driven load differential pressure, water/steam watts and compressor clearance. Other control parameters referred to herein are defined accordingly.

The present invention is specific to a MW reference curve which is based on a megawatt signal (DW) being multiplied by a gain (WQDWG) which is then representative of Total Fuel Flow (FQT). Currently, all water injection flows are derived from fuel flows. The ability to shape the megawatt signal to a fuel flow relationship is an important aspect of the present invention.

The gains are derived by data gathering during the gas turbines's normal operating conditions and with the unit in $NO_x$ compliance using the fuel flow (FQT) as the controlling signal for water injection control. The data is manipulated in accordance with the present invention and the result is a set of gain values that characterize the megawatt signal such that it can be used in place of the fuel flow signal.

The megawatt signal is developed from electrical taps off of the generator output lines and feed back into a megawatt transducer, which converts this voltage into a control signal (DW) that is sent to the control system software.

For the purposes of the present invention the General Electric SPEEDTRONIC™ Gas Turbine Control System is used for describing the invention. It would be apparent to one of ordinary skill in the art that the control parameters could be used from any gas turbine control system and that the present invention would be usable therewith.

FIG. 1 illustrates a gas turbine constructed in a well known manner and an associated control system in accordance with the invention. A gas turbine 23 is drivingly connected to a compressor 21. A fuel controller 17 introduces fuel into the combustor 19, which is then introduced into the turbine 23 along with the products of the compressor 21. The turbine 23 drives a generator 25 which produces electrical power.

The control system 15 of the preferred embodiment is a General Electric SPEEDTRONIC™ Gas Turbine Control System. However, it should be appreciated by those skilled in the art that the present invention may be used with a variety of control systems as well as differing versions of any one manufacturer's control system. This system is designed to fulfill all requirements of operating a gas turbine electric power generating system. The control system performs many functions, such as: fuel, air and emissions control; sequencing of turbine fuel and auxiliary for start-up, cool down and shutdown; monitoring of all turbine, control and auxiliary functions; protection against unsafe and unlawful operating conditions; and providing feedback to human users.

The General Electric SPEEDTRONIC™ system uses signals generated from sensors located in the combustor 19, compressor 21 and turbine 23 as input variables for its algorithms. Specifically, for emissions control, the SPEEDTRONIC™ system uses a signal generated from only one source: fuel flow transmitters that are associated with a metering tube orifice. These transmitters are set up in a split-range function, such that the first transmitter measures low gas flows and the second transmitter measures high gas flows, in order to provide accurate flow readings across the full range of gas flow. This reliance on a single source can result in errors which can cause the control system 15 to indicate that it is in compliance with applicable government regulations, even though it is not.

As there exists only one source of data which is sent to the control system 15 for fuel flow evaluation, an actual fuel flow error can possibly be created due to the single transmitter function and its effect directly relates to the $NO_x$ Emissions Monitoring as reported to the state.

Several problems can exist with the transmitter, independently, that will cause emissions to be incorrectly reported. An error in the calibration of the transmitter or an offset to a properly calibrated transmitter, such as gas fuel condensate in one leg of the transmitter, can report a lower fuel flow. This in turn, due to how the GE algorithm is designed, will not cause or show out of compliance alarms by the emissions monitoring system unless a continuous emissions monitoring system is in use.

The megawatt module 13 is a modification to the SPEEDTRONIC™ system to allow for water injection based on a megawatt reference curve for $NO_x$ control when required. The addition of a second and independent data source, other than the gas fuel flow transmitter function, can be used as a backup reference for mitigating any single source data problems. Since the megawatt transmitter is an extremely accurate data source, requiring in most cases no recalibration year after year of unit operation, it is an excellent comparison for the gas fuel flow transmitter.

The megawatt module 13 is designed to allow the units to operate as in the past in compliance to $NO_x$ emissions as permitted for each specific site and does not change or modify the existing GE algorithm. By now monitoring the variances, between the existing gas fuel flow and newly installed megawatt reference signal, the control system 15 is capable of detecting and transferring $NO_x$ water injection control from the existing GE algorithm to the megawatt algorithm.

This megawatt module 13 utilizes the existing megawatts transducer signal in the SPEEDTRONIC™ system to produce a conditioned signal that is compatible with fuel flow scaling, in pounds per second (#/sec). The megawatt module 13 also adds: two operator alarms and the ability of automatically switching between megawatt and fuel flow curves; the ability to start and stop the unit while functioning on the megawatt control curve; and the ability to perform maintenance on the $NO_x$ fuel flow system while the unit is in-service with the megawatt function in control and manual curve compensation through the use of one control constant that affects both Fuel and megawatt curves.

Figure 2:
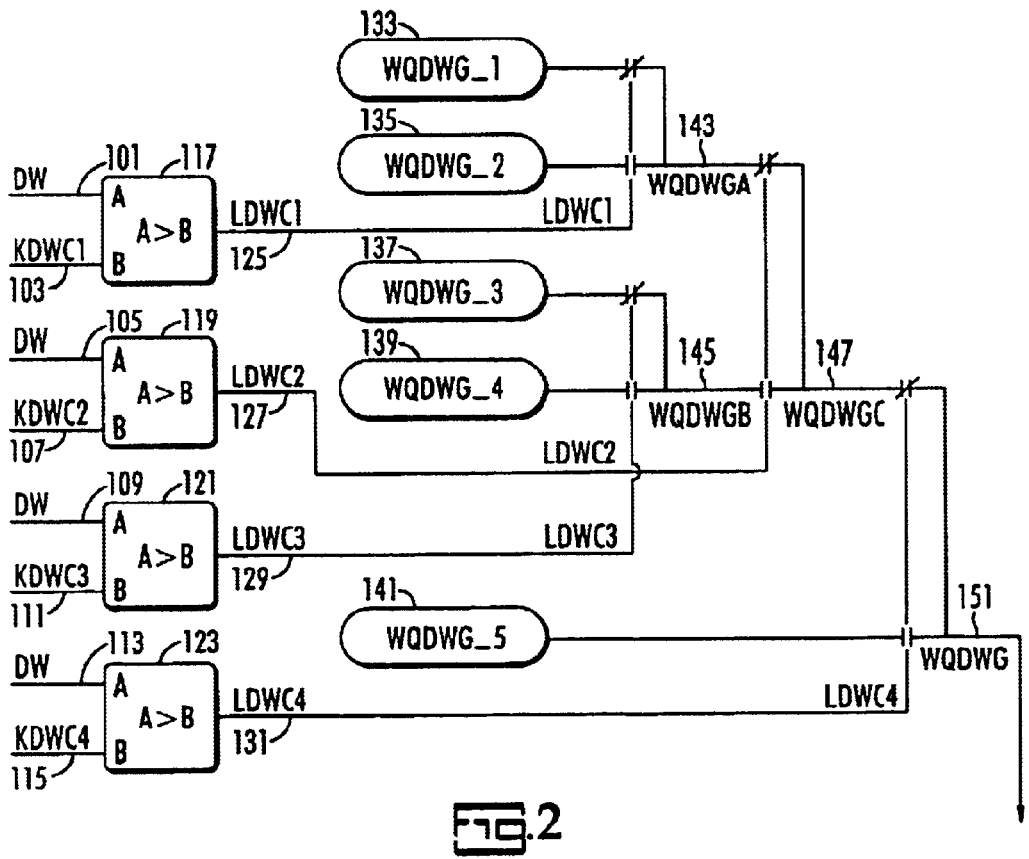
FIG. 2 illustrates part of the control algorithm of the invention.

With reference now to FIG. 2, part of the control algorithm of the invention is illustrated wherein control constants are used at different times of the slope of the megawatt reference curve. The signal DW 101, 105, 109, 113 is compared to control constants KDWC1 103, KDWC2 107, KDWC3 111, KDWC4 115. The comparison code 117, 119, 121, 123 outputs Boolean values LDWC1 125, LDWC2 127, LDWC3 129, LDWC4 131. The value LDWC1 125 is then used to determine which of the two constants, WQDWG_1 133 or WQDWG_2 135 proceeds to the next comparison and is designated WQDWGA 143. The value LDWC3 129 is then used to determine which of the two constants WQDQG_3 137 or WQDQG_4 139 proceeds to the next comparison and is designated WQDWGB 145. The value LDWC2 127 is used to determine which of the resultant constants, WQDWGA 143 or WQDWGB 145 proceeds to the next comparison and is designated WQDWGC 147. The value LDWC4 131 is used to determine whether WQDWGC 147 or control constant WQDWG_5 141 proceeds from the control block and is designated WQDWG 151. This is the gain to be used based on a range in a megawatt scale.

Figure 3:
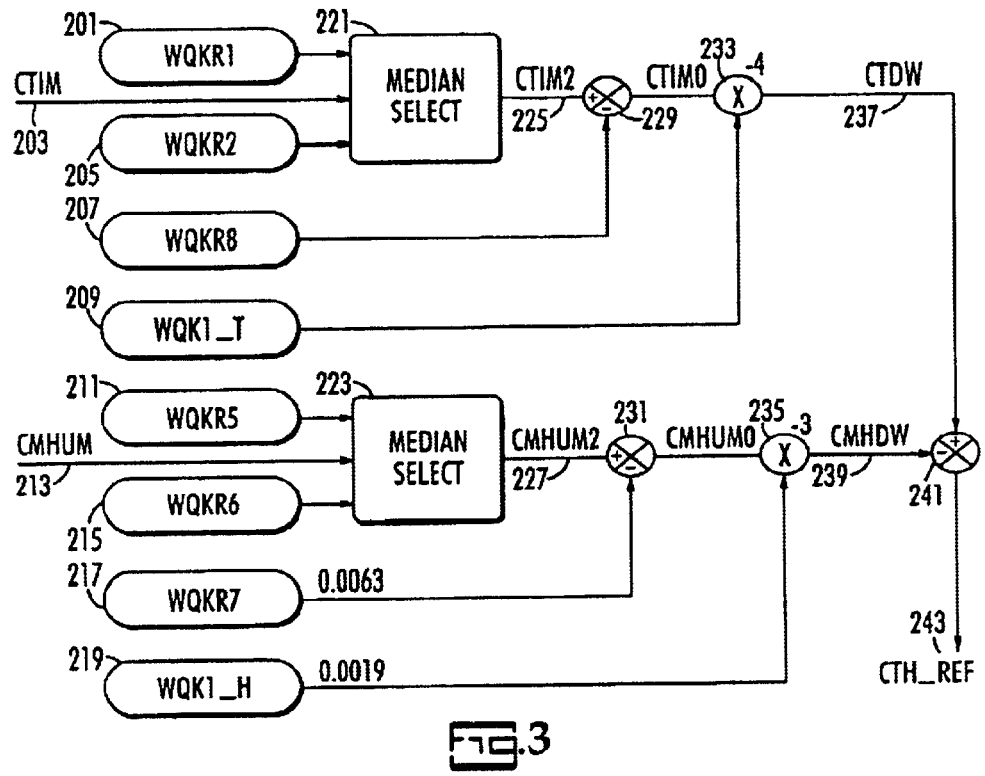
FIG. 3 illustrates part of the control algorithm of the invention.

With reference now to FIG. 3, another part of the control algorithm of the invention is illustrated. Constant controls WQKR1 201 and WQKR2 205 are fed into a median select operator 221 along with a compressor temperature inlet value 203. The resultant median value is designated CTIM2 225 and is scaled 229 with a constant WQKR8 207 to result in the value CTIM0 230. CTIM0 230 is then multiplied with a gain constant WQK1_T 209 to result in a positive value CTDW 237.

Additionally, constant controls WQKR5 211 and WQKR6 215 are fed into a median select operator 223 along with a relative humidity value 213. The resultant median value is designated CTHUM2 227 and is scaled 231 with a constant WQKR7 217 to result in the value CMHUM0 230. CTIM0 230 is then multiplied 235 with a gain constant WQK1_H 219 to result in a value CMHDW 239. CMHDW 239 is then subtracted 241 from CTDW 237 to result in temperature reference CTH_REF 243.

Figure 4:
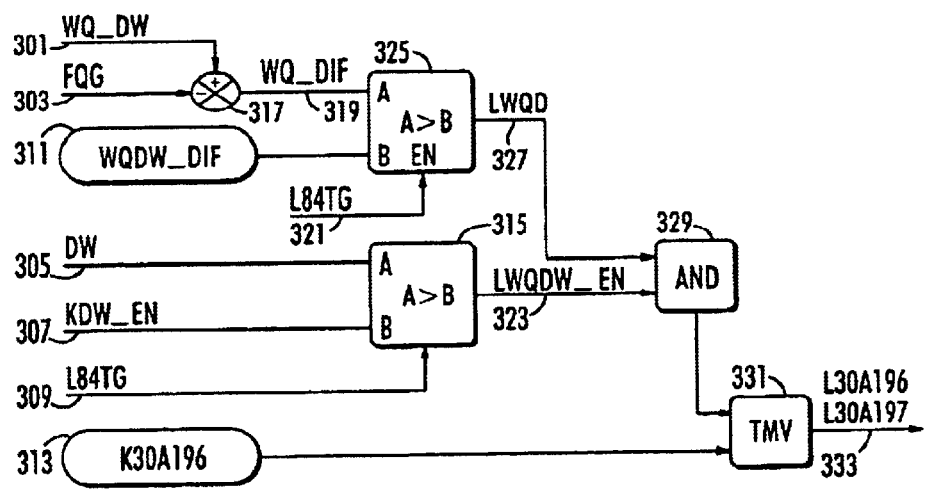
FIG. 4 illustrates part of the control algorithm of the invention.

With reference now to FIG. 4, another part of the control algorithm of the invention is illustrated whereby alarms may be activated. A measurement WQ_DW 301 based on water flow in megawatts is offset 317 with a value FQG 303 to result in a value WQ_DIF 319. This value is compared 325 with constant value WQDW_DIF 311 if the enable value L84TG 321 is active high, which occurs when the system is operating on total gas as opposed to a mixture of gas and fuel such as diesel. The resulting Boolean value LWQD 327 is sent to an "AND" comparison with a value derived as follows. The value DW 305 comes in through a megawatt transducer and is compared to KDW_EN 307 if the enable value L84TG 309 is active high, which occurs when the system is operating on total gas as opposed to a mixture of gas and fuel such as diesel. The resulting Boolean value is compared in the "AND" comparison 329 and the resultant value is entered into a TMV 331 along with a duration constant K30A196 313. If the signal 330 goes into the TMV 331 for longer than the duration constant 313, then the alarm values L30A196 and L30A197 333 are sent on to further areas of the system.

Figure 5:
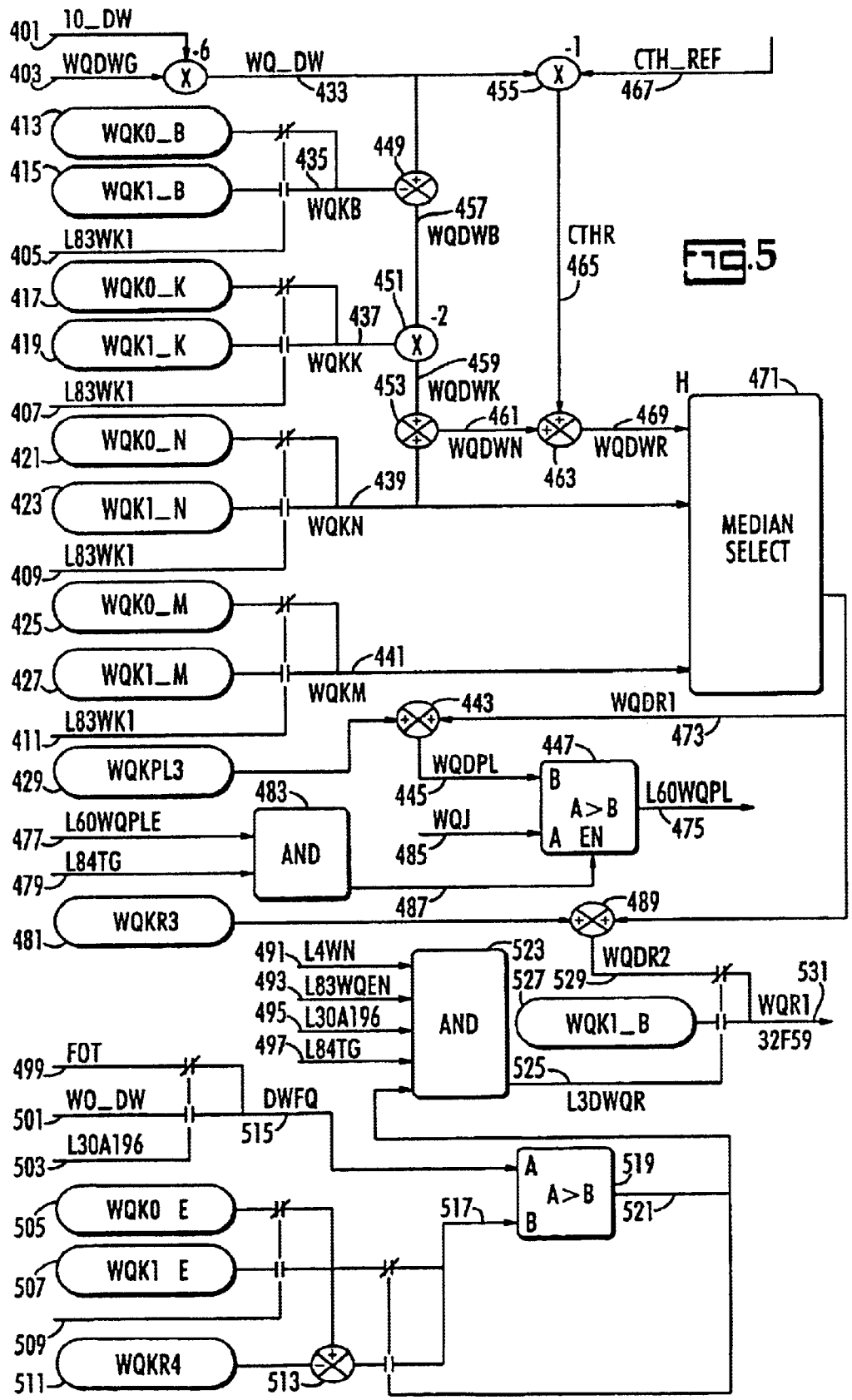
FIG. 5 illustrates part of the control algorithm of the invention.

With reference now to FIG. 5, another part of the control algorithm of the invention is illustrated. The signal DW 401 is based on actual megawatts and is multiplied 431 with the gain to be used based on a range in the megawatt scale, WQDWG 403 and results in the water flow based on megawatts, WQ_DW 433. WQ_DW 433 is multiplied 455 with CTH_REF 467 to result in CTHR 465.

WQ_DW 433 is further offset by the value WQKB 435, which is either constant WQK0_B 413 or constant WQK1_B 415 depending on control value L83WK1 405 which comes from the original GE algorithm and is based on high flow versus low flow. The result of the offset is WQDWB 457 is then multiplied by the value WQKK 437 which is either constant WQK0_K 417 or constant WQK1_K 419 depending on control value L83WK1 407 which comes from the original GE algorithm and is based on high flow versus low flow. This result is WQDWK 459 which is then offset by value WQKN 439 which is either constant WQK0_N 421 or constant WQK1_N 423 depending on control value L83WK1 409 which comes from the original GE algorithm and is based on high flow versus low flow. The resultant offset WQDWN 461 is offset 463 with value CTHR 465 and fed into a median select operation 471. Also fed into the median select operation 471 is value WQKN 439 and value WQKM 441, which is either constant WQK0_M 425 or constant WQK1_M 427 depending on control value L83WK1 411 which comes from the original GE algorithm and is based on high flow versus low flow.

The output from the median select 471 is WQDR1 473 is offset with constant value WQKPL3 429 and the result WQDPL 445 is a protective limit fed into a comparison 447 with WQJ 485, which is the actual flow based on flow meters in the fuel injection line. This comparison is enabled 467 by the result of an "AND" comparison between GE controls L60WQPLE 477 and L84TG 479. The result L60WQPL 475 may be used in the control algorithm at a further time.

The control constant WQKR3 461 is offset with WQDR1 473 to result in a master value WQDR2 529. This master value or a constant equaling zero WQDW_Z 527 is then output as the water ratio input WQRI 531 which defines how much H2O is injected into the system. The decision between WQDW_Z 527 and WQDR2 529 is made based upon the following derivation which results in control value L3DWQR 525 which is used to promote value WQDW_Z 527 or WQDR2 529.

Total fuel flow is represented as FQT 499 and the water flow equivalent in MW is WQ_DW 501, and alarm condition L30A196 333 is used to promote either FQT 499 or WQ_DW 501 to value DWFQ 515. DWFQ 515 is compared to the resultant of constants WQK0_E 506 or WQK1_E 507 based upon a value L83WK1 509 from the GE subsystem. The resulting value is offset 513 with constant WQKR4 11 and compared with DWFQ 515, with the resultant 521 placed in an "AND" comparison with a master permissive from the GE algorithm L4WN 491, a GE water protection value L83WQEN 493, the alarm signal L30A196 333 and the total gas Boolean L84TG 497 to result in L3DWQR 525, which is the control to determine the final output WQRI 531.

The use of GE variable WQRI 531 is crucial to the invention, as WQRI 531 is not used in the GE algorithm and is constant at zero. This enables the megawatt algorithm to match existing GE control constants, so that if the manufacturer changes the value of the GE constants, no recoding of the invention algorithm is necessary. Also, as many jurisdictions mandate the use of GE-compatible algorithms, this use of a previously unused GE variable (WQRI 531) allows the use of the invention without compromising GE compatibility.

It would be apparent to one of ordinary skill in the art that any data transmission herein can be recorded by a digital storage medium as known in the art.

It is thus seen that this invention provides a highly accurate means of detecting and controlling variations in the water injection process, traditionally based on process fuel flow, that is used in controlling the gas turbine's water injection for meeting Federal and State regulatory limits on $NO_x$ and CO emissions per the issued site license in such a manner that out-of-compliance fines are highly unlikely to be incurred.

As the above description is exemplary in nature many variations will become apparent to those with skill in the art. Such variations however may be embodied within the spirit and scope of this invention as defined by the following appended claims.

What is claimed is:

1. A method for controlling a computerized system for accurate, independent verification of natural gas fuel flow in order to control $H_2O$ injection flows as said $H_2O$ is injected into a combustion system to control emissions, comprising:

receiving gas turbine control parameters from a gas turbine control system;

receiving control parameters from a megawatt transducer;

calculating values based upon readings from said control system and said megawatt transducer;

comparing said values to a megawatt reference curve;

detecting an abnormal reading;

starting a timing sequence during which said reading is monitored;

transferring $NO_x$ and $H_2O$ water injection control to a megawatt module at completion of said timing sequence;

alerting operator of said transfer;

allowing for return of control to said gas turbine control system once said abnormal reading is corrected.

2. The method for controlling the computerized system of claim 1, further comprising performing maintenance of the $NO_x$ fuel flow system while said system is being utilized.

3. The method for controlling the computerized system of claim 1, further comprising manual curve compensation through the use of one control constant for offset capabilities.

4. The method for controlling the computerized system of claim 1, further comprising automatically switching between megawatt and fuel flow curves.

5. The method for controlling the computerized system of claim 1, further comprising the utilization of a non-utilized data point in the GE algorithm.

6. The method for controlling the computerized system of claim 1, wherein data is recorded.

* * * * *